United States Patent [19]
Turner

[11] Patent Number: 5,307,364
[45] Date of Patent: Apr. 26, 1994

[54] ADDITION OF OXYGEN TO A GAS MIX FOR USE IN AN EXCIMER LASER

[75] Inventor: Brian A. Turner, Chester, N.J.

[73] Assignee: Spectra Gases, Inc., Irvington, N.J.

[21] Appl. No.: 66,541

[22] Filed: May 24, 1993

[51] Int. Cl.$^5$ ............................................. H01S 3/22
[52] U.S. Cl. ...................................... 372/60; 372/55; 372/57
[58] Field of Search ................... 372/57, 60, 55, 59

[56] References Cited

U.S. PATENT DOCUMENTS

| | | | |
|---|---|---|---|
| 4,964,137 | 10/1971 | Aramaki et al. | 372/59 |
| 5,029,178 | 7/1991 | Tarui | 372/60 |
| 5,073,896 | 12/1991 | Reid et al. | 372/59 |
| 5,090,020 | 2/1992 | Bedwell | 372/57 |
| 5,199,267 | 4/1993 | Mitsui | 372/59 X |

FOREIGN PATENT DOCUMENTS 9216036 2/1992 PCT Int'l Appl. .

*Primary Examiner*—James W. Davie
*Attorney, Agent, or Firm*—Lerner, David, Littenberg, Krumholz & Mentlik

[57] ABSTRACT

The present invention relates to discovery that oxygen may be used to stabilize the efficiency and performance of an excimer laser. Therefore, oxygen is not a contaminant to be minimized but rather a necessary part of an excimer lasing composition.

19 Claims, No Drawings

ADDITION OF OXYGEN TO A GAS MIX FOR USE IN AN EXCIMER LASER

FIELD OF THE INVENTION

The invention relates to the field of excimer lasers and specifically to methods and lasing compositions capable of stabilizing the performance of excimer lasers.

BACKGROUND OF THE INVENTION

One of the recognized problems of excimer lasers is contamination of the lasing gas composition. contamination can occur from impurities created during laser operation and by the various contaminants introduced into the lasing gas composition from the components used in the laser, such as, for example, plastics. To deal with these sorts of impurities, a number of elaborate purification methods and devices have been developed including those described in U.S. Pat. Nos. 4,964,137, 5,073,896 and 5,090,020, the complete text of which are hereby incorporated by reference. Amongst the undesirable impurities that these methods and devices were developed to remove include $CO_2$, $Cl_2$, CO, $CCl_4$, $SiF_4$, HF, NO, $NO_2$, $N_2O_4$, $H_2O$, $NH_3$, $N_2$, $O_2$, $H_2$, $CF_2O$, $OF_2$, $CH_3Cl$, $CH_4$, and $CH_3F$.

Another source of potential contamination, not specifically addressed by the aforementioned patents, is imparted during the manufacture of the gas. Contaminants may be introduced during gas handling and mixing.

Gas manufacturers have always attempted to minimize the content of impurities in their gas. While certain maximum tolerances are often established by manufacturers for impurities such as $N_2$, $O_2$, HF and $H_2$, manufacturers traditionally attempt to keep the amount of such impurities well below maximum tolerance. For example, the inventor has always attempted to maintain $O_2$ below 5 ppm, although published tolerance was 25 ppm. Manufacturers have also attempted to maintain consistently low levels of contaminants such as oxygen well below any published tolerances from batch to batch to help foster predictable and repeatable laser performance.

But, despite their best efforts to maintain strict quality control specifications, inexplicably, some cylinders of lasing gas composition produce acceptable performance, i.e. consistent and high levels of output and lasing efficiency, and some do not. One aspect of the present invention is the identification of a cause of that variability.

The inventor undertook an extensive analysis of rare gas halide lasing compositions which provided unstable lasing performance in an attempt to determine the source of the instability. After analyzing the data, the present inventor was struck by a trend in the characteristics exhibited by excimer lasers using "acceptable" and "unacceptable" batches of lasing composition. It was apparent to the inventor that the first quantity of lasing composition introduced into the excimer laser from cylinders containing otherwise "unacceptable" lasing compositions always produced the best performance.

To resolve this minor mystery, one cylinder of rare gas halide lasing composition which had provided unstable lasing performance was subjected by the inventor to a test in which the cylinder was repeatedly unhooked and re-attached to the laser each time a lasing run was finished. Normal air purging procedures were followed each time the tank was re-attached to remove the air introduced into the gas feed assembly. Despite purging, however, the inventor discovered that this procedure had the effect of letting some air into the laser, air which was not completely expelled with the subsequent introduction of additional lasing composition. Amazingly, the output power of the laser did not decrease between each run as previously observed. In short, the laser exhibited a more stable power output. The inventor therefore concluded that some component of air was a required additive to stabilize excimer laser performance.

Additional tests were conducted whereby standard lasing compositions were doped with HF, hydrogen, synthetic air, natural air (wet) and oxygen. It was determined that synthetic air, natural air (wet) and oxygen made the laser work better, i.e. provided more stable performance. Nitrogen and HF had no noticeable impact on the laser performance. This test established that not all of the components of naturally occurring air provided additional stabilized performance to excimer lasers.

To confirm that oxygen was responsible for the increased stability and performance of an excimer laser, two new batches of lasing composition were produced containing three and five ppm of oxygen respectively. When these formulations were introduced into an excimer laser, the results were poor. Ten ppm of oxygen was then added to one cylinder and 15 ppm of oxygen was added to the other. The resulting lasing compositions were re-introduced into an excimer laser and the excimer laser exhibited exemplary performance. The inventor has therefore discovered that oxygen, or oxygen containing compounds, formally thought to be contaminants to be minimized, are actually necessary for providing stable lasing performance to rare gas halogen excimer lasers. The inventor does not currently know why the introduction of $O_2$ or other oxygen containing compounds stabilizes an excimer laser's output. The inventor does know, however, that the introduction of $O_2$ as described herein does not in any way change the nature of the excimer, i.e. the laser still emits at the same frequency.

OBJECTS AND SUMMARY OF THE INVENTION

It is an object of the present invention to provide a lasing composition which can provide stable, uniform predictable results when used in an excimer laser.

It is also an object of the present invention to provide a lasing composition which is capable of ensuring the long term peak performance of an excimer laser.

In accordance with this aspect of the present invention there is provided a lasing composition which includes at least one halogen source gas, at least one rare gas, and an oxygen containing stabilizer. The oxygen containing stabilizer should be present in an amount which is effective to stabilize an excimer laser using said lasing composition.

Also provided in accordance with this aspect of the present invention is a lasing composition suitable for use in an excimer laser including at least one halogen source gas, at least one rare gas, and, optionally, at least one inert diluent gas. This mixture is improved by providing an oxygen containing stabilizer in an amount effective to stabilize the performance of an excimer laser using the lasing composition.

Until recently, oxygen and oxygen containing compounds were considered contaminants to be minimized. Applicants have surprisingly found, however, that oxygen and certain other oxygen containing compounds can be used as a stabilizer in a lasing gas composition.

It is another object of the present invention to provide for methods of producing a lasing composition which is capable of stabilizing the performance of an excimer laser as well as methods of using a stabilizing lasing composition to stabilize an excimer laser.

In accordance with these aspects of the present invention there is provided a method of producing a stabilizing excimer lasing composition which includes certain steps.

First, a lasing composition including at least one halogen source gas, at least one rare gas and, optionally, at least one inert diluent gas is provided. Second, the amount of an oxygen containing stabilizer in said lasing composition is controlled such that the oxygen containing stabilizer is present in an amount which is effective to stabilize an excimer laser using the lasing composition.

A method of stabilizing an excimer laser is also provided including the steps of doping a lasing composition useful in an excimer laser with an oxygen containing stabilizer in an amount which is effective to stabilize an excimer laser, and introducing the doped lasing composition into an excimer laser.

It is also an object of the present invention to provide for a stabilized excimer laser utilizing the stabilized lasing composition of the present invention.

DETAILED DESCRIPTION OF THE PREFERRED EMBODIMENT

One aspect of the present invention includes the discovery that oxygen or other oxygen containing compositions are not impurities to be minimized or eliminated from a lasing composition. Instead, it has been surprisingly found that oxygen and certain other oxygen containing compositions can be added to certain lasing compositions and used to effectively stabilize the performance of an excimer laser.

The inventor has identified a class of oxygen containing compositions which can be used as stabilizers,, designated herein as oxygen containing stabilizers, which, when added in an effective amount, provides a lasing composition which exhibits very stable performance. The term "oxygen containing stabilizer" as used herein includes, but is not limited to $O_2$, Air (wet), Air (synthetic-$O_2$/$N_2$), Air (normal compressed) $O_3$, CO, NO, $NO_2$, and $N_2O$, although $O_2$ is preferred.

By stabilizing the performance of an excimer laser, it is meant that the efficiency of the laser due to the absorption of laser light or the degradation of the laser gas excitation process can be minimized, particularly relative to a similar gas containing no oxygen containing stabilizer or an insufficient amount thereof. The actual amount of oxygen containing stabilizer used may vary from laser to laser as its specifications demand and from one lasing composition to another. Generally, however, the amount of an oxygen containing stabilizer, which is effective to stabilize an excimer laser using that lasing composition, is an amount sufficient to provide the equivalent of between about 10 and about 100 ppm $O_2$.

It is not known what form the oxygen exists in during lasing. Nonetheless, it has been discovered that if the oxygen containing stabilizer used is oxygen, then between about 10 and about 100 ppm oxygen should be provided. If, however, for example, $N_2O$ is used as the oxygen containing stabilizer, then between about 20 and about 200 ppm would be necessary. On the other hand, only between about 6.6 and about 67 ppm of ozone would be necessary.

More preferably, the oxygen containing stabilizer should be provided in an amount which is sufficient to provide the equivalent of between about 10 and about 50 ppm $O_2$. Most preferably, however, the amount of oxygen containing stabilizer provided is an amount sufficient to provide the equivalent of between about 15 and about 50 ppm $O_2$.

The stabilizing lasing compositions of the present invention include not only the oxygen containing stabilizer previously discussed, but also at least one halogen source gas and at least one rare gas. These two gases interact in an excimer laser, under excitation conditions, to provide the dimeric compositions which actually constitute the excimer.

"Halogen" encompasses any material from Group VIIA of the periodic table. However, halogen source gas encompasses fluorine, chlorine and bromine in gaseous form. These may be derived from such halogen containing gases such as $F_2$, $NF_3$, $Cl_2$, HCl, HBr and $Br_2$.

Rare gases, also known as noble gases, constitute a class of generally unreactive gases with filled outer electronic shells such as helium, neon, argon, and xenon. Krypton and radon can also be referred to as rare or noble gases although radon is a radioactive isotope and is generally not used in excimer lasers. The lasing composition of the present invention also traditionally includes at least one inert diluent gas or buffer gas which makes up the majority of the volume of the lasing composition. Inert diluent gases are generally composed of noble or rare gases such as, most commonly, helium and neon.

As a general guideline, lasing compositions in accordance with the present invention constitute a buffer gas which is usually neon, but sometimes helium or a mixture of neon and helium which constitutes between about 85% and 90% of the total volume of the gas mixture. The rare gas, usually xenon, argon and krypton, which act as part of the active species of the lasing gas, generally constitutes no more than about 10% of the total volume of the laser. Finally, the halogen source gas, usually including fluorine or chlorine, occupies less than 1% of the total gas volume and often less than 0.5% of the total volume of the laser. The total level of impurities in the gas should be minimized as much as possible and preferably should be well under 100 ppm (parts per million). If possible, they should be limited to less than 25 ppm. Oxygen, however, as previously described, should be present in an amount of between about 10 and about 100 ppm and, more preferably, between about 10 and about 50 ppm. Most preferably between 15 ppm and 50 ppm of $O_2$ is used. For many applications, however, between about 25 and about 75 ppm of $O_2$ is useful. Larger or smaller amounts of oxygen containing stabilizers other than oxygen per se may be necessary to provide an equivalent amount of oxygen as previously discussed.

Gas cylinders in accordance with the present invention are generally prepared by the following procedure. Each cylinder will generally be filled with at least one halogen source gas, at least one rare gas, an oxygen containing stabilizer and, optionally, at least one inert diluent gas. First, the hydrostatic test date on each mixture cylinder is checked as is the condition of the related valve. Thereafter, the evacuated mixture cylinder is weighed to get a tare weight.

The filling system is checked to ensure that all of the gases needed to make the mixture are accessible and the quality of the various gases are checked to ensure that they meet an individual customer's specification. The mixture cylinder is then connected to the manifold of, for example, a Compressed Gas Association 670 valve and tightened. The manifold system is evacuated to a partial pressure of about 25 microns. Thereafter, a 100 psig of nitrogen is pumped into the manifold system. Then the pressure in the system is increased to 500 psig. The system is snooped with a mixture of soap and water for a period of approximately 5 minutes to verify that there are no leaks in the manifold system. Then the manifold system is vented. Once the system is at 5 psig, the vent is closed and a valve is open to a pump so that the cylinder and manifold system can be evacuated. Once the entire system reaches 25 microns vacuum, the mixture cylinder must be checked one at a time for vacuum. If the vacuum remains at 25 microns or drops when the cylinder is opened, the cylinder is ready to fill. If the pressure increases when the cylinder is opened, the cylinder is rejected.

The precise mixture to the customer's specification is calculated on a work order sheet. The partial pressure of each component is calculated separately. All of the cylinder gases used to make the mixture are logged on a production sheet. Each cylinder of source gas is then filled, one at a time, starting with the lowest concentration component. The first component is introduced into the mixture cylinder and filled to a calculated pressure. The source gas cylinder is then closed and the manifold is purged with a blowdown gas, preferably a plurality of times. The system is then evacuated to under 35 microns. These steps are then repeated for each of the individual source gases introduced into the receiving or mixture cylinder. When all components are filled, the system is evacuated to under 30 microns. The mixture cylinder is then disconnected and weighed separately to verify the components. The cylinders are then rolled for 30 minutes and the gas mixture is analyzed for halogen and oxygen concentration levels by, for example, GC/mass spect.

While the foregoing was described in terms of filling a gas cylinder, essentially the same procedure may be used to create the appropriate gas mixture directly in a laser.

EXAMPLE 1

Cylinders containing a lasing composition comprising fluorine, argon, neon (totalling approximately 66% of the fill) and helium (balance) were tested for their comparative performance levels. Three runs were performed with each cylinder using a Summit Technologies system S/N 2107 excimer laser system.

| Run # | Time | Power (millijoules/pulse) | |
|---|---|---|---|
| | | Good Cylinder* | Bad Cylinder** |
| 1 | Initial | 155 | 156 |
| | 1 minute | 155 | 154 |
| | 2 minute | 154 | 154 |
| 2 | Initial | 154 | 140 |
| | 1 minute | 154 | 145 |
| | 2 minute | 153 | 148 |
| 3 | Initial | 152 | 132 |
| | 1 minute | 153 | 140 |

-continued

| Run # | Time | Power (millijoules/pulse) | |
|---|---|---|---|
| | | Good Cylinder* | Bad Cylinder** |
| | 2 minute | 151 | 142 |

*Cylinder No. 408988 (10.5 ppm $O_2$)
**Cylinder No 384752 (3 ppm $O_2$)

The cylinder containing acceptable "good" lasing composition exhibited very little variation in performance from run to run. However, the greatest degree of uniformity and the highest level of power output from the unacceptable "bad" lasing composition was exhibited in the first run.

EXAMPLE 2

Two newly made gas mixes having the composition described in Example 1 were produced, one having 3 ppm of oxygen and the other containing 5 ppm of oxygen. These two cylinders were tested as in Example 1.

| Run # | Time | Power (millijoules/pulse) | |
|---|---|---|---|
| | | Cyl. No. 293053* | Cyl. No. 293048** |
| 1 | Initial | 126 | 131 |
| | 1 min. | 130 | 133 |
| | 2 min. | 130 | 134 |
| 2 | Initial | 120 | 117 |
| | 1 min. | 124 | 125 |
| | 2 min. | 125 | 126 |

*3 ppm $O_2$
**5 ppm $O_2$

Thereafter, additional oxygen was added to each cylinder and the gas reintroduced into a laser and rerun.

| Run | Time | Power (millijoules/pulse) | |
|---|---|---|---|
| | | Cyl. No. 293053* | Cyl. No. 293048** |
| 1 | Initial | 150 | 147 |
| | 1 min. | 146 | 144 |
| | 2 min. | 143 | 140 |
| 2 | Initial | 142 | 145 |
| | 1 min. | 142 | 143 |
| | 2 min. | 142 | 140 |

***10 ppm $O_2$ added (total 13 ppm)
****15 ppm $O_2$ added (total 20 ppm)

As is self-evident, when the level of oxygen contained in the lasing composition was 5 ppm or lower, the performance of the laser was unacceptable. The range of variation from run to run was relatively large and the highest level of power output was relatively low. Moreover, the level of power output did not tend to decrease from run-to-run as would be expected. After the initial run, the power levels became erratic. All other things being equal, when the concentration of oxygen was elevated to over 10 ppm and preferably to over about 15 ppm, dramatically different results were realized. The highest level of power output was enhanced and the rate of variation from run to run decreased. Moreover, the power profile from run-to-run showed a more expected continual decrease. The erratic behavior of the power output seemed to have been eliminated. It is particularly ironic that the lower limit for acceptable results appears to be approximately 10 ppm as, for years, the inventor and others in this field have struggled to maintain oxygen levels below 5 ppm.

The principles, preferred embodiments, and modes of operation of the present invention have been described in the foregoing specification. The invention which is intended to be protected herein, however, is not to be construed as limited to the particular embodiments disclosed, since these are to be regarded as illustrative rather than restrictive. Variations and changes may be made by others without departing from the spirit and scope of the invention.

I claim:

1. A lasing composition consisting essentially of:
   at least one halogen source gas;
   at least one rare gas; and
   an oxygen containing stabilizer present in an amount sufficient to provide the equivalent of between about 10 and less than about 50 ppm $O_2$, and optionally at least one inert diluent gas.

2. The lasing composition of claim 1 including at least one inert diluent gas.

3. The lasing composition of claim 1, wherein said halogen source gas is selected from the group consisting of $F_2$, $NF_3$, $Cl_2$, HCl, HBr, and $Br_2$.

4. The lasing composition of claim 1, wherein said rare gas is selected from the group consisting of Ar, Kr and Xe.

5. The lasing composition of claim 2, wherein said inert diluent gas is selected from the group consisting of He and Ne.

6. The lasing composition of claim 1, wherein said oxygen containing stabilizer is selected from the group consisting of $O_2$, Air, $O_3$, CO, NO, $NO_2$, and $N_2O$.

7. The lasing composition of claim 1, wherein said oxygen containing stabilizer is $O_2$.

8. A lasing composition comprising $F_2$ provided in an amount of about 0.24%, argon provided in an amount of about 9.3%, an oxygen containing stabilizer present in an amount sufficient to provide the equivalent of between about 10 and about 50 ppm $O_2$, and a diluent gas which is a mixture of Ne and He, said Ne being provided in an amount of about 57.0% with the balance being He.

9. A method of stabilizing an excimer laser comprising the steps of:
   doping a lasing composition useful in an excimer laser with an oxygen containing stabilizer in an amount sufficient to provide the equivalent of between about 10 and less than about 50 ppm $O_2$; and
   introducing said doped lasing composition into an excimer laser.

10. A stabilized excimer laser comprising:
    an excimer laser, with the proviso that said excimer laser does not include a cryogenic purification system, and a lasing composition in said excimer laser including at least one halogen source gas; at least one rare gas; and an oxygen containing stabilizer present in an amount which is effective to stabilize said excimer laser and wherein said oxygen containing stabilizer is maintained within said laser throughout the useful life of said lasing composition.

11. The laser of claim 10, wherein said oxygen containing stabilizer is provided in an amount sufficient to provide the equivalent of between about 10 and about 100 ppm $O_2$.

12. The laser of claim 11, wherein said oxygen containing stabilizer is provided in an amount sufficient to provide the equivalent of between about 10 and about 50 ppm $O_2$.

13. The laser of claim 12, wherein said oxygen containing stabilizer is provided in an amount sufficient to provide the equivalent of between about 15 and about 50 ppm $O_2$.

14. The laser of claim 10, wherein said oxygen containing stabilizer is selected from the group consisting of $O_2$, Air (wet), $O_3$, CO, NO, $NO_2$, and $N_2O$.

15. A method of stabilizing an excimer laser comprising the steps of:
    doping a lasing composition useful in an excimer laser with an oxygen containing stabilizer in an amount which is effective to stabilize an excimer laser; and
    introducing said doped lasing composition into said excimer laser, with the proviso that said excimer laser does not use a cryogenic purification system and maintaining said oxygen containing stabilizer within said laser throughout the useful life of said doped lasing composition.

16. The method of claim 15, wherein said oxygen containing stabilizer is provided in an amount sufficient to provide the equivalent of between about 10 and about 100 ppm $O_2$.

17. The method of claim 16, wherein said oxygen containing stabilizer is provided in an amount sufficient to provide the equivalent of between about 10 and about 50 ppm $O_2$.

18. The method of claim 17, wherein said oxygen containing stabilizer is provided in an amount sufficient to provide the equivalent of between about 15 and less than 50 ppm $O_2$.

19. The method of claim 9, wherein said oxygen containing stabilizer is selected from the group consisting of $O_2$, Air, $O_3$, CO, NO, $NO_2$, and $N_2O$.

* * * * *

UNITED STATES PATENT AND TRADEMARK OFFICE
CERTIFICATE OF CORRECTION

PATENT NO. : 5,307,364

DATED : April 26, 1994

INVENTOR(S) : Brian A. Turner

It is certified that error appears in the above-identified patent and that said Letters Patent is hereby corrected as shown below:

Column 6, line 7, "384752" should read --385752--.
Column 6, line 38, after "Run" insert --#--.

Signed and Sealed this

Thirtieth Day of August, 1994

Attest:

BRUCE LEHMAN

Attesting Officer

Commissioner of Patents and Trademarks